UNITED STATES PATENT OFFICE.

SAMUEL WITHERS, OF PHILADELPHIA, PENNSYLVANIA, ASSIGNOR OF FOUR-TENTHS TO JOSEPH J. SLEEPER, OF SAME PLACE.

MARBLEIZING.

SPECIFICATION forming part of Letters Patent No. 242,728, dated June 7, 1881.

Application filed December 27, 1880. (Specimens.)

*To all whom it may concern:*

Be it known that I, SAMUEL WITHERS, a citizen of the United States, residing in the city and county of Philadelphia, and State of Pennsylvania, have invented a new and useful Improvement in Marbleizing and Decorating Slate, Iron, &c., which improvement is fully set forth in the following specification.

My invention consists of a novel manner of marbleizing, granitizing, and decorating slate, stone, iron, wood, cloth, paper, papier-maché, leather, glass, porcelain, china, crockery, &c.; and in carrying out the same I first prime the material with common paint. The color to be employed for the decoration is ground in water and mixed to the required consistency with fermented liquor, sweet or sour, such as ale or beer, vinegar, &c., and applied over the priming. I make a strong hot solution of soap-suds, sal-soda, or other suitable alkali, and sprinkle, spray, or splash it on the surface of the applied color while yet wet, for which purpose I employ an atomizer, brush, or other suitable tools or devices. When the color, as treated, is dry, a coating of varnish is applied as a finish.

It will be seen that when the alkali is thrown on the wet color the union thereof causes "running" and the formation of veins and other fanciful designs, which will be found to be attractive, bright, and durable.

I am aware that it is not new to prime materials with common paint, then apply a coating of color ground in water mixed with fermented liquor, and next sprinkle on said coating, while wet, spirits of wine, &c., the latter, however, not producing the same results as in my case, where I employ a hot solution of alkali.

Having thus described my invention, what I claim as new, and desire to secure by Letters Patent, is—

The improvement in marbleizing or decorating slate, iron, wood, &c., consisting in priming the material with paint, then applying a coating of color ground in water mixed with fermented liquor, next sprinkling on the coating, while wet, a hot solution of alkali, and finally applying varnish as a finish, substantially as and for the purpose set forth.

SAML. WITHERS.

Witnesses:
JOHN A. WIEDERSHEIM,
JOS. J. SLEEPER.